Feb. 2, 1943.  D. W. TIFFANY  2,309,805
LIGHT FOR LICENSE PLATES
Filed Sept. 12, 1941

D. W. Tiffany
INVENTOR.
BY

Patented Feb. 2, 1943

2,309,805

UNITED STATES PATENT OFFICE 2,309,805

LIGHT FOR LICENSE PLATES

Daniel Warren Tiffany, Helena, Mont.

Application September 12, 1941, Serial No. 410,642

1 Claim. (Cl. 240—7.1)

This invention relates to portable lights or illuminating devices, especially designed for use in connection with motor vehicle license plates.

The primary object of the invention is to provide means wherein the indicia and numbers of a front license plate will be clearly visible in the dark, even when the vehicle is moving at a high rate of speed.

An important object of the invention is to provide a device of this character which may be readily and easily mounted on a license plate without the necessity of making extensive alterations in the conventional license plate.

Still another object of the invention is to provide a means for securing a lamp to a license plate, which will securely hold the lamp in position against accidental displacement.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
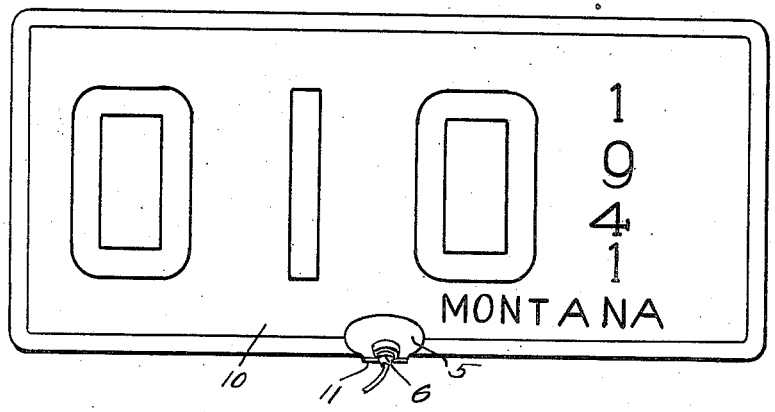
Figure 1 is an elevational view of the license plate equipped with an illuminating means constructed in accordance with the invention.
Figure 2:
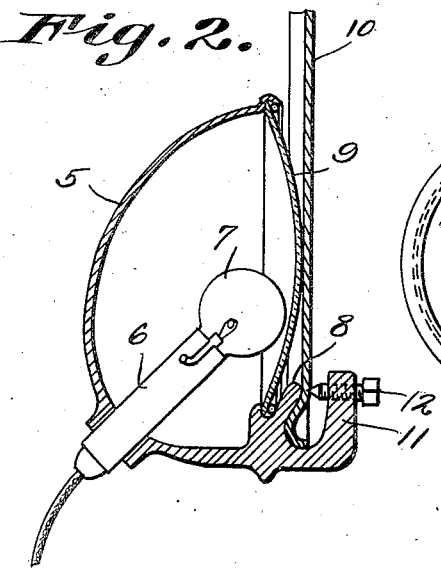
Figure 2 is a vertical sectional view through a license plate and a lamp attached thereto.
Figure 3:
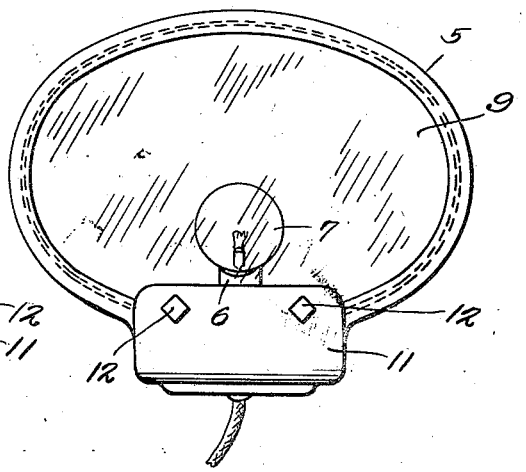
Figure 3 is a front elevational view of the lamp.

Referring to the drawing in detail, the device comprises a hollow body portion indicated generally by the reference character 5, the body portion being formed with an opening near the lower edge thereof, for the reception of the lamp socket 6, which is shown as positioned therein. The lamp socket is substantially long, so that the light bulb 7, which is supported therein, will be disposed adjacent to the open side of the body portion 5.

As clearly shown by Figure 1 of the drawing, the body portion is formed with a wide upstanding enlargement 8 formed with a curved recess to receive one edge of the lens 9 of the lamp.

The enlargement 8 is also formed with a forward curved surface curved to conform to the curvature of the lower edge of the license plate, which in the present showing is indicated at 10.

Spaced from the enlargement 8, and extending upwardly from the lower portion of the body portion 5, is a wide flange 11, which is formed with threaded openings to accommodate the set screws 12 which are so arranged that when they have been positioned, they will lie directly opposite to the upstanding enlargement 8, to clamp the license plate between the set screws 12 and enlargement 8.

Due to this construction, it will be seen that the device may be readily and easily secured along the edge of a license plate without the necessity of making changes in the conventional construction of the license plate, to position the device.

Figure 4:
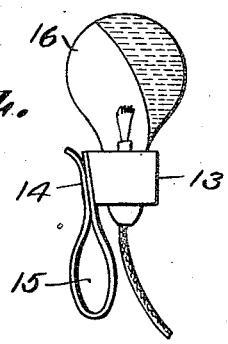
Figure 4 is an elevational view illustrating a modified form of lamp securing device.

In the modified form of the invention as indicated by Figure 4 of the drawing, the device is in the form of a socket member indicated at 13, which in turn is provided with a spring clamp 14 adapted to be positioned over one edge of a license plate. The clamp 14 is so constructed that an enlarged opening 15 is provided for the reception of the curved edge of the license plate.

In this form of the invention, the reflecting surface is provided by coating one portion of the lamp 16, positioned in the socket member 13, with a suitable reflecting material.

It will of course be understood that the lamp sockets in both cases, are wired with the light circuit of the motor vehicle with which the auxiliary lights are used, so that when the usual light circuits are completed, the lamps will be lit.

Due to the specific construction of applicant's body portion, it will be seen that the lens will lie in a position in close contact with the license plate illuminated, the body portion being spaced from the license plate, so that light rays projected from the lamp will be directed onto the numbers of the license plate illuminating the numbers and indicia thereon. It will further be seen that because the lens of the auxiliary light is disposed adjacent to the license plate, the lens will be protected against breakage, by the license plate.

Having thus described the invention, what is claimed is:

An auxiliary light for illuminating motor vehicle license plates, comprising a substantially semi-spherical shaped body having an open side, a concavo-convex lens closing the open side of the body, the convex surface of the lens adapted to rest directly against the front of the license plate with which the auxiliary light is used, the open side of the body being only slightly spaced from the license plate whereby light rays may flood the license plate, a clamp formed on the body adjacent to the lower edge of the body and adapted to clamp over one edge of the license plate, and an electric lamp supported within the body and adapted to direct light rays directly onto the face of the license plate illuminating the license plate.

DANIEL WARREN TIFFANY.